US006089614A

United States Patent [19]

Howland et al.

[11] Patent Number: 6,089,614

[45] Date of Patent: Jul. 18, 2000

[54] SECURITY DEVICE

[75] Inventors: Paul Howland, Hants; Kenneth John Drinkwater; Brian William Holmes, both of Surrey, all of United Kingdom

[73] Assignee: De La Rue International Limited, Basingstoke, United Kingdom

[21] Appl. No.: 09/194,943

[22] PCT Filed: Jun. 13, 1997

[86] PCT No.: PCT/GB97/01600

§ 371 Date: Dec. 22, 1998

§ 102(e) Date: Dec. 22, 1998

[87] PCT Pub. No.: WO97/47478

PCT Pub. Date: Dec. 18, 1997

[30] Foreign Application Priority Data

Jun. 14, 1996 [GB] United Kingdom ................... 9612496

[51] Int. Cl.[7] .............................. B42D 15/00; B32B 9/00

[52] U.S. Cl. ................................ 283/91; 283/72; 283/73; 283/85; 283/87; 283/91; 283/94; 283/99; 283/109; 283/113; 283/114; 283/117; 283/901; 428/29; 428/30; 428/209

[58] Field of Search ................................ 283/72, 73, 85, 283/87, 91, 94, 99, 109, 113, 114, 117, 901; 428/29, 30, 209

[56] References Cited

U.S. PATENT DOCUMENTS

| | | | |
|---|---|---|---|
| 5,851,032 | 12/1998 | Green | 283/72 |
| 5,855,989 | 1/1999 | Mantegazza | 283/72 |

FOREIGN PATENT DOCUMENTS

| | | |
|---|---|---|
| 0 628 408 A1 | 12/1994 | European Pat. Off. . |
| 2 282 563 | 4/1995 | United Kingdom . |

*Primary Examiner*—Andrea L. Pitts
*Assistant Examiner*—Mark T. Henderson
*Attorney, Agent, or Firm*—Oliff & Berridge, PLC

[57] ABSTRACT

A security device comprises a substrate (1) having a viewing region (3) which is provided on one side with first indicia (7) and on the other side with second indicia (9) overlying the first indicia. The substrate carries an obscuring material (10) aligned with the second indicia (9) so as to prevent at least the second indicia from being viewed from the one side of the substrate under reflected radiation. The substrate is sufficiently transparent while the obscuring material permits the passage of sufficient transmitted radiation to allow the second indicia (9) to be viewed from the one side of the substrate under transmission conditions.

46 Claims, 4 Drawing Sheets

Fig.13.
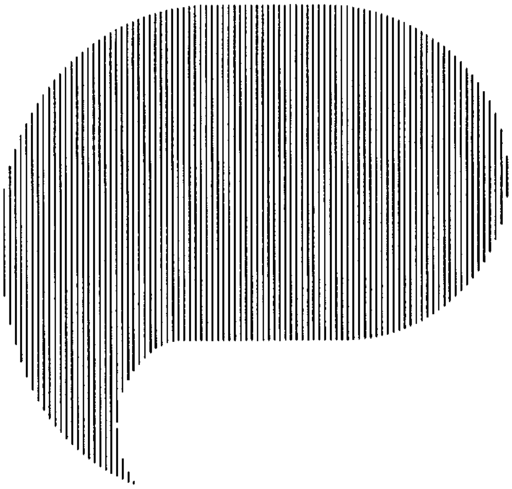
Fig.14.
Fig.15.
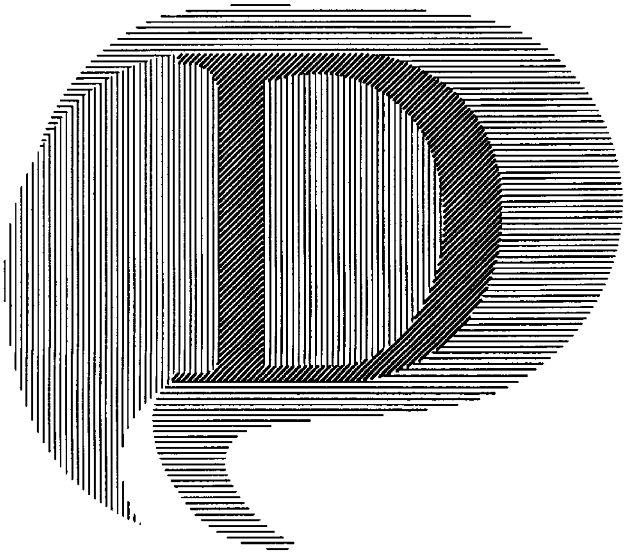

SECURITY DEVICE

The invention relates to security devices, particularly for use with documents of value.

In the field of security documents, such as banknotes and the like, there is a continuing need to incorporate security devices which prevent such security documents from being counterfeited using the increasingly sophisticated commercial printing equipment which is available.

Examples of security devices which have been used in the past include complex patterns printed on the document, optical devices such as diffraction gratings and holograms and the like.

For certain translucent papers a security feature which involves providing (usually printing) an image on both sides of the paper was developed many years ago. In one form, herein defined as a "see-through" feature, complementary images are provided on each side of the sheet precisely registered relative to one another such that when the sheet is held up to the light, the image on the back will fit exactly into spaces within the image on the front, optionally with an even unprinted margin around the perimeter. For example, each image could comprise a series of coloured segments, segments on one side of the sheet fitting within the spaces between the segments on the other. Printing of these images is normally carried out with specialised lithographic presses which allow simultaneous front and back printing during one printing run. In this way, the tolerances applied to the design elements are typically a fraction of a millimeter and any variation caused by counterfeiting by printing both sides during different printing runs can be quickly noticed. By printing on both sides in a single impression, misregister due to variations in the dimensions of the sheet caused by change of moisture content or heating and the like are avoided. See-through features have four nodes of visual inspection—the first image viewed in reflected light, the image on the other side of the sheet viewed in reflected light, the composite image viewed by transmitted light as viewed from the first side and with the image on that side predominating, and finally the composite image as viewed on the other side of the sheet with the image on that side predominating, on transmissive viewing of see-through features the image on the opposite side of the sheet is seen to be in register in a genuine document.

An example of see-through features used with banknotes and the like is described in EP-A-0388090 in which the feature is provided in a region of the sheet which has a substantially uniform transparency which is more transparent than a majority of the remainder of the sheet in the absence of applied ink.

DE-A-3208004 describes the use of periodic lineal point patterns on opposite sides of a sheet which, when viewed in transmission, produce a characteristic moire pattern indicating that the sheet is genuine.

GB-A-2282563 illustrates the use of apparently random patterns of dots at opposite sides of the sheet which, when viewed in transmission, generate a recognizable pattern.

EP-A-0628408 relates to the inclusion of a printed layer, laminated between two paper sheets, the print only being visible in transmitted light. The image may be registered to an image on one of the outer layers in a cooperative way so as to form a complete image.

EP-A-0755799 relates to a letterpress printing technique that autoregisters a fluorescent image on one side of a document to a letterpress image on the other side.

WO 94/29119 describes an embossed structure that is designed to give a switching effect across a transparent zone.

The effect is due to light being reflected as a consequence of the angle of incidence either exceeding or not exceeding the critical angle as a consequence of the embossed surface. This results in light either being reflected off the surface or being allowed to pass through. The effect is obtained when the embossed pattern on the front side exactly coincides with the reverse side pattern.

U.S. Pat. No. 4,307,899 describes a process for creating watermark effects on cards rather than paper. In this case, multiple layers of print are produced either by overprinting or lamination. The overlapping layers interact in transmitted light to give an image with light intensity gradients rather like a watermark. These may be in colour or in grey tones alone. The key point is that the objective is to produce a watermark-like effect, optionally complimented by extra dimension such as fluorescence or colour.

DE-A-2532935 describes a process for manufacturing documents of value such as identity cards having a plurality of film transparent material, a screened design consisting of a plurality of lines being printed on at least two of the films.

The primary advantage of see-through features is the difficulty in counterfeiting such features. Partly, this is due to the need to achieve exact registration between the indicia on each side of the sheet and partly due to the fact that the counterfeiter may not even realise that the feature exists.

One of the problems which can arise when using see-through features is that on the one hand it is necessary to incorporate the indicia on each side of the substrate in a region of the substrate which is relatively transparent or translucent to enable both indicia to be viewed in transmission, while on the other hand the more translucent the region, the easier it is to see both indicia when viewed in reflected light. If the indicia on both sides of the substrate are visible in reflected light this clearly diminishes the value of the see-through feature because there is no longer a readily recognisable contrast between the images seen in reflected and transmitted light.

One approach to solve the problem would be to provide one set of indicia at a high intensity relative to the other indicia so as to obscure the second indicia when the device is viewed in reflection. However, this is not satisfactory in many cases.

In accordance with a first aspect of the present invention, a security device comprises a substrate having a viewing region which is provided on one side with first indicia and on the other side with second indicia overlying the first indicia, the substrate carrying an obscuring material aligned with the second indicia so as to prevent at least the second indicia from being viewed from the one side of the substrate under reflected radiation, the substrate being sufficiently transparent and the obscuring material permitting the passage of sufficient transmitted radiation to allow the second indicia to be viewed from the one side of the substrate under transmission conditions and is characterized in that the obscuring material is positioned between the first and second indicia.

This aspect of the invention overcomes the problem set out above by including an obscuring material on the substrate which prevents the second indicia from being seen in reflected light from the one side of the substrate but which is transparent or translucent to transmitted light.

The first aspect of the invention can be used to enhance known see-through security features as well as permitting new security features to be developed which can be used in viewing regions where the substrate is very transparent or translucent.

A high level of transparency is advantageous since it allows the use of relatively low intensity indicia involving for example light pastel colours and the use of fine line structures which cannot normally be distinguished due to problems of light diffusion as light passes through the substrate. Light pastel colours are desirable because they are more difficult for a counterfeiter to faithfully reproduce with a colour copier, printer or scanner.

The term "indicia" refers to all localised constructions whether they be of an abstract, geometric or a representational nature. In some cases, the interaction between two indicia on each side of the substrate may be limited to only a small fraction of the area covered by each individual indicia.

The obscuring material may be provided on the one side of the substrate under the first indicia, or on the other side of the substrate under the second indicia.

The radiation used for viewing the indicia would typically be in the visible light range but could include radiation outside the visible range such as infrared or ultraviolet. These latter wavelength ranges increase the security of the feature by hiding the device from the average user. Furthermore, one or both of the indicia may define machine readable images, and may only be detectable outside the visible wavelength range.

A wide variety of materials could be used for the obscuring material. Examples include an iridescent material or a metallic material. In the latter case, the substrate could be coated with a metallic material which is then partially demetallised to enable the second indicia to be viewed through the metallisation. This is particularly appropriate with a plastics substrate. Alternatively, the substrate could be coated with a very thin film of aluminum, metal oxide or other reflective layer such that it is highly reflective but sufficiently transparent to enable the second indicia to be viewed in transmitted light.

In some examples, the first and/or second indicia can be apparently random dot or line structures which, when viewed in transmission, generate a recognisable pattern or the like. In other examples, the first and/or second indicia define recognisable patterns (such as security patterns) or images such as geometric shapes, alphanumeric characters and the like.

In either case, in the preferred arrangement the first and/or second indicia is associated with further indicia on the same side of the substrate adjacent the viewing region. This makes it much more difficult for a counterfeiter to duplicate an item carrying the security (device since he must associate the device with the further indicia.

Typically, the further indicia and associated first or second indicia define a security pattern extending across the viewing region and into part of the substrate surface adjacent the viewing region. Counterfeiting of this arrangement would require very accurate registration.

The term "association" is also intended to include other forms of association such as a juxtaposition of different patterns, one or more of which is defined by the first and/or second indicia and the remainder by the further indicia. An example would be a word in which one or more of the letters was defined by the first and/or second indicia and the remaining letters by the further indicia.

Preferably, the first and second indicia together define a characteristic image. This enables the device easily to be authenticated either by the eye or by a machine in the case of a machine readable image.

The image can have any form which is recognisable including geometric shapes, line patterns, alphanumeric characters and the like. Once again, in preferred examples the image is associated with further indicia on the substrate adjacent the viewing region. This increases the difficulty of counterfeiting.

The challenge facing the counterfeiter with see-through security features is two fold. First to correctly register the front and reverse side indicia. Second, to register elements of the indicia or associated secondary indicia that are a different colour. By making the feature more visible and memorable (as achieved by the present invention), failure to achieve these technical challenges leaves the counterfeiter open to discovery. This is not the case to the same extent with the more traditional see-through features previously described because they are easier to reproduce and less discernable to the general public due to the high opacity of the substrate.

In most cases, the substrate will form part of the item to be protected such as a document of value. In some cases, the entire substrate will be sufficiently transparent or translucent to the appropriate radiation but in the preferred arrangement, the substrate is more transparent in the viewing region than elsewhere (in the absence of applied ink) as described more fully in EP-A-0388090.

This area of greater transparency will be formed typically during manufacture of the substrate as described in GB-A-2282611 and GB-A-2283026 or it could be formed during a post processing operation.

In other cases, the device could be constructed separately from the item or support to which it is to be affixed, the device being provided in use on a region of a support through which radiation can be transmitted, the substrate comprising a transparent material which overlies the second indicia and on which is provided the first indicia.

In these cases, the substrate can comprise a varnish or lacquer while the second indicia may be provided on the support or on the underside of the substrate.

In all cases, the first and/or second indicia can be provided by printing such as offset, gravure or screen printing or by any other suitable technique such as a transfer process.

The substrate will typically be a paper such as rag paper and the like but could also comprise a plastics material such as a plastics film or other material such as credit card material, non-wovens and the like. In one application, the viewing region is defined by a plastics material which is located within a sheet such as a paper sheet during manufacture of the sheet.

In accordance with a second aspect of the present invention, a security device comprises a substrate including a viewing region which is provided with first indicia on one side of the substrate and second indicia on the other side of the substrate overlapping the first indicia, wherein at one orientation of viewing the substrate from the one side under transmitted radiation, the first indicia obscure the second indicia, and at another orientation the second indicia are visible through the first indicia and is characterised in that the first and second indicia comprise dots.

This new see-through security device makes use of the thickness of the substrate to introduce a parallax effect between the first and second indicia.

This is an effect not previously used as a security feature. It is a potentially very powerful security feature by virtue of its difficulty to counterfeit and its ability to be clearly seen by the general public. It is not immediately apparent that such a combination would be clearly visible because of the distorting effect of diffraction and the limited resolving sensitivity of the eye. However, by careful choice of the configuration of the first and second indicia, these potential limitations can be overcome.

In a simple example, each of the first and second indicia comprise dots which at the one orientation of viewing are in alignment with one another so that the second indicia cannot be seen but in the other orientation the second indicia are visible through the gaps between the dots of the first indicia.

Preferably, the second indicia define a recognisable image so that by changing the orientation of the security device, the image is either obscured or visible.

As with the first aspect of the invention, either or both of the first and second indicia can in themselves constitute a recognisable image which further may be associated with further indicia on the substrate.

In the case of parallel line structures, the two different orientations of viewing will lie in respective planes perpendicular to the directions of the lines. The use of dots however means that viewing can be achieved in a variety of orientations.

In a particularly preferred example, each of the first and second indicia comprise a mixture of lines and dots. On varying the orientation of viewing of such a device, a variety of different images will be presented. This is particularly difficult to counterfeit because of the demanding registration accuracy required of both the front and back side print.

In a preferred arrangement, the one orientation of viewing is constituted by viewing the one side of the substrate normally although in other arrangements normal viewing could constitute the other orientation so that the second indicia are visible upon normal viewing and not when viewed at an angle to the normal.

Typically, the thickness of the substrate in the viewing region will be of the same order of magnitude as the width of dots constituting the first and second indicia.

In many cases, the indicia will be provided in a single colour. However, further embodiments can be achieved by providing the first indicia and second indicia in different colours. This can lead to the result that on viewing the device at different angles, up to three different colours can be seen corresponding to the colours of the first and second indicia individually and the result of combining those colours.

In addition, although the substrate will normally comprise an item to be authenticated, the security device could be provided in use on a region of a support through which radiation can be transmitted, the substrate comprising a transparent material which overlies the second indicia and on which is provided the first indicia.

It will be understood that the second aspect of the invention could be utilized with the first aspect of the invention and the provision of an obscuring material to restrict the visibility of the second indicia when the substrate is viewed in reflection from the one side.

In accordance with a third aspect of the present invention, a security device comprises a substrate including a viewing region which is provided on one side with first indicia and on the other side with second indicia overlying the first indicia, wherein the first and second indicia can both be seen when the device is viewed from one side of the substrate under transmitted radiation, the first and second indicia cooperating together to generate an image different from the appearance of the first and second indicia individually, each of the first and second indicia comprising at least ones block, the block(s) of one indicia overlapping the block(s) of the other indicia, and the blocks of the first and second indicia having different colours.

This aspect of the invention provides a further significant enhancement of see-through security devices. By providing the first and second indicia in blocks of different colours, a further colour will appear where there is overlap resulting from the combination of the two colours. Furthermore, each of the first and second indicia itself could be defined in more than one colour.

Typically, where the blocks include lines, the lines of each block are substantially parallel with each other, the lines defining one block of one of the indicia extending at an angle to the lines defining another block in the same indicia.

In a particularly preferred arrangement, one or more of the colours could be fluorescent so that they are only visible in ultraviolet light.

Some examples of security devices according to the invention will now be described with reference to the accompanying drawings, in which:

FIGS. 13 and 14 illustrate first and second indicia of a further device; and FIG. 15 illustrates the appearance of the device of FIGS. 13 and 14.

Figure 1:
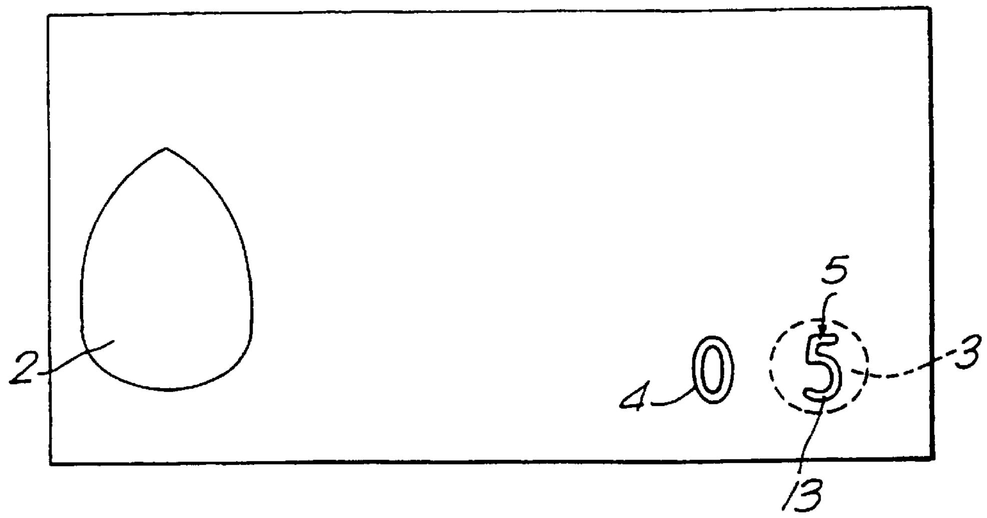
FIG. 1 is a schematic plan of a banknote carrying a security device.

FIG. 1 illustrates a document of value such as a banknote 1 containing a graphical watermark 2 of conventional form illustrated in outline and a viewing region 3 having an area of even transparency which is more transparent than surrounding areas of the banknote. The banknote 1 will carry conventional printing (not shown) including a character "0" illustrated at 4 adjacent the viewing region 3.

A see-through security device 5 is located within the viewing region 3.

Typically, the viewing region 3 will comprise a more transparent part of the substrate forming the banknote 1 but in some cases it could be defined by a plastics insert within a surrounding paper support. In addition, the banknote 1 could comprise a plastics substrate.

Figure 2:
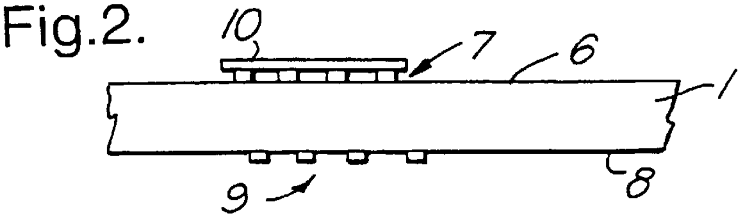
FIGS. 2–4 are schematic, cross-sections through a comparative example and two examples of security devices according to the invention incorporating a highly reflective layer.

FIGS. 5–9 illustrate various examples of see-through devices and these will be described in due course. In the first set of examples, however, each see-through device is associated with one or more reflective elements. Thus, as can be seen in FIG. 2 which is a schematic cross-section through a security device of a comparative example, an upper surface 6 of the banknote 1 is printed with first indicia 7 and the under surface 8 of the banknote 1 is printed with second indicia 9. The first indicia 7 are covered by a patch 10 of an iridescent material which is adhered over the first indicia 7. When the upper surface 6 of the banknote 1 is viewed in reflected light, the iridescent path 10 will obscure the underlying first indicia 7 and the viewing region 3 will appear to have the colour of the patch 10. If, however, the banknote 1 is viewed in transmitted light, the iridiscent patch 10 becomes transparent so that both the first and second indicia 7,9 can be seen at the same time.

One of the main major benefits of this is that it allows highly transparent viewing regions to be utilised.

Figure 3:
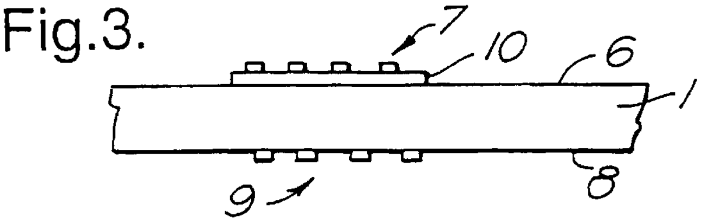

FIG. 3 illustrates an examples of a configuration according to the invention in which the patch 10 is adhered directly to the upper surface 6 of the banknote 1 and the first indicia 7 are printed on top of the patch. In this case, when the upper surface 6 of the banknote 1 is viewed in reflection, the first indicia 7 will be seen but not the second indicia 9.

Figure 4:
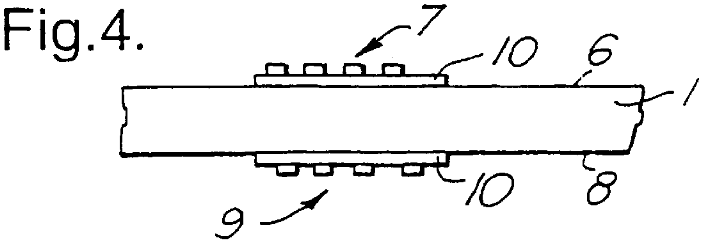

In FIG. 4, two iridescent patches 10 are provided directly on the upper and lower surfaces 6,8 respectively, the first and second indicia 7,9 being printed on the respective patches. In this case, if the upper surface 6 of the banknote 1 is viewed in reflected light only the indicia 7 will be seen whereas if the surface 8 is viewed in reflected light only the second indicia 9 will be seen. When the banknote 1 is viewed in transmitted light both the first and second indicia 7,9 will be seen together.

EXAMPLE

Cotton fibres were refined to produce a fibre slurry with an average fibre length of 1.0 mm and a freeness of 50 SR. The fibre slurry was deposited on a cylinder mould, pressed and dried so as to produce an 80 gsm sheet of paper. The paper was then screen printed with an indicia using a UV curable ink containing an iridescent gold pigment.

The formulation for the ink was as follows:

Iriodin 205 (iridescent gold mica pigment from Merck) 10%

Laromer LR 8869 (resin from BASF) 86%

Photoinitiator 1. (Daracure 1173 from Ciba Geigy) 2%

Photoinitiator 2. (Lucerine TPO from BASF) 2%

[all percentages based on weight]

A screen, squeegee type and pressure were chosen so as to achieve an application of 30 gsm.

This resulted in the paper being transparentised over the area of the indicia and also having a highly reflective surface due to the iridescent pigment.

The paper was then sized and calendered to produce paper with a finish typical for that of banknote paper. A see-through feature was then printed over the iridescent, translucent indicia on both the front and back of the paper.

For comparative purposes, the above process was repeated using a plain translucent indicia that did not incorporate a highly reflective iridescent pigment but which was identical in all other respects.

It was found that the see-through feature printed over the plain translucent indicia was compromised by virtue of the fact that the reverse side image was visible in both reflected and transmitted light.

The see-through feature printed over the translucent iridescent feature on the other hand was virtually indiscernible in reflected light but was visible in transmitted light.

By way of additional comparison, the same see-through feature was printed over an area that was not printed with a translucent indicia. This feature was significantly less visible than either of the previous examples in transmitted light. It was not visible in reflected light.

In each of the above examples, the term "see-through feature" refers to an image whose recognisable totality can only be discerned by simultaneously combining the images printed in register on opposite sides of the paper.

In the examples described so far, the item 10 has been described as an iridescent patch. In alternative configurations, the patch 10 could include a partially metallised surface which is highly reflective but which allows both the first and second indicia to be viewed under transmission conditions. The examples of FIGS. 3 and 4 could be fabricated without the use of a separate patch 10 by applying a partial metallisation to the surfaces 6 and 8. This is particularly suitable in the case of a plastics substrate. The use of a separate patch 10 is generally preferred where the substrate is paper. In the case of a metallisation, this could be aluminium, cobalt or nickel and could be applied by chemical or vacuum deposition or by sputtering techniques. Typically, the metallisation would be applied in very fine dots or with an applied deposition low enough to maintain sufficient light transmission.

As well as iridescent, the patch could be formed of a pearlescent material, and in general, any material capable of reflecting or absorbing radiation is suitable including certain refractory materials.

The indicia 7,9 can be provided in any conventional manner using conventional inks such as lithographic inks including coloured inks, white inks, black inks, metallic inks, optically variable inks (such as those incorporating thin film optical interference filters) and the like. Thermochromic inks, photochromic inks, fluorescing and phosphorescing inks may also be employed. The inks may be employed in rainbow printing fashion.

The indicia may also be printed with white or colourless substances which are difficult to detect by eye but which are detectable by machine sensing, such as X-ray absorptive inks. Using such a technique the security feature will only be made viewable on an X-ray photograph.

Figure 5:
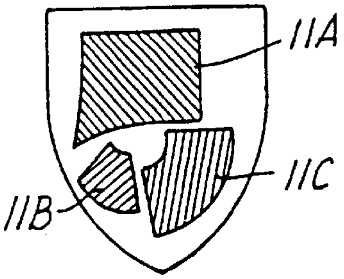
FIGS. 5A, 5B and 5C illustrate a first example of the first indicia viewed in reflection, the second indicia reviewed in reflection, and the first and second indicia reviewed in transmission respectively.
Figure 5:
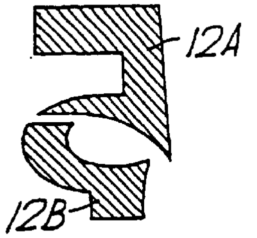
Figure 5:
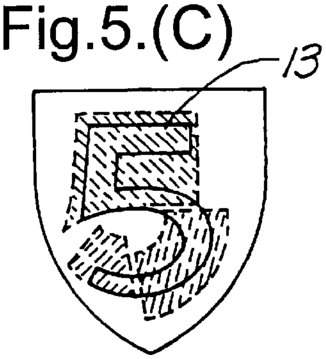

FIG. 5 illustrates a first example of a see-through device constructed in accordance with FIG. 3 and in which the first indicia 7 comprise three blocks 11A–11C (FIG. 5A) each block being defined by a set of parallel lines, the lines of each block being angularly offset from the lines of the other blocks. The second indicia 9 printed on the underside 8 of the banknote 1 is shown in FIG. 5B and comprises a pair of blocks 12A,12B defined by sets of parallel lines as shown. It will be appreciated that the second indicia shown in FIG. 5B is shown as it would appear when the banknote 1 is turned over with the side 8 uppermost. When the sides 6,8 of the banknote 1 respectively are viewed under reflected light the appearance will be as shown in FIG. 5A and FIG. 5B respectively. The effect of the patch 10 is to prevent the other indicia in each case being seen. However, when the viewing region 3 is viewed in transmitted light, for example with the surface 6 uppermost, then both sets of indicia 7,9 will be visible and the blocks are so arranged and overlap such that a new image 13 appears. In this case, the image is in the form of the numeral "5". In FIG. 5C the cross-hatching shows the location of the blocks 11A–11C. The image 13 appears where the blocks of the first indicia overlap the blocks of the second indicia.

Figure 6:
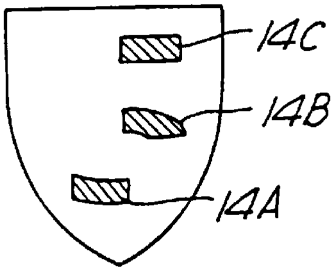
FIG. 6–9 are views similar to FIG. 5 showing four further examples.
Figure 6:
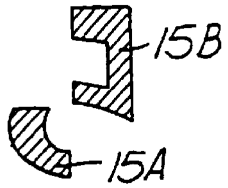
Figure 6:
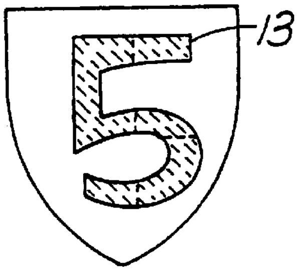

FIG. 6 illustrates a device similar to that shown in FIG. 5 except that the blocks of the two indicia do not overlap. Thus, the first indicia (FIG. 6A) comprises blocks 14A–14C and the second indicia comprises blocks 15A,15B. When the device is viewed in transmitted light, the image 13 will appear as shown in FIG. 6C.

Figure 7:
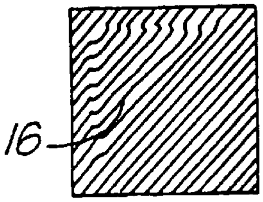
Figure 7:
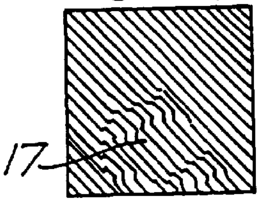
Figure 7:
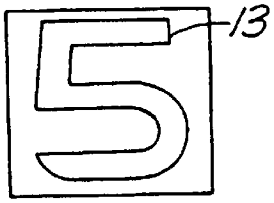

The device shown in FIG. 7 comprises first and second indicia formed by sets of substantially parallel lines but with certain discontinuities in the lines as can be seen at 16 and 17. When this is viewed in transmission, the discontinuities cause reinforcement of the corresponding lines in the other indicia the areas of reinforcement forming the image 13.

Figure 8:
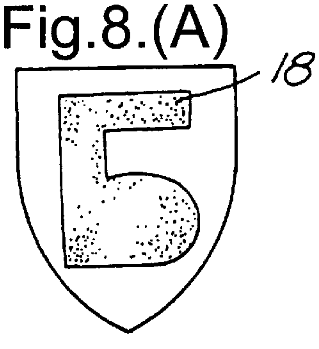
Figure 8:
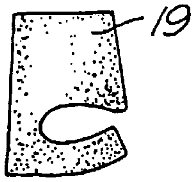
Figure 8:
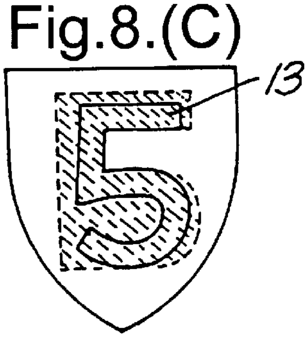

In any of the examples described, each of the first and second indicia could be defined by different colours and it would also be possible for different regions of each image to be differently coloured. Where parts of the first and second indicia overlap, the use of different colours leads to the generation of additional effects. Thus, FIG. 8 illustrates a device in which the first indicia 18 is shown in FIG. 8A and is printed with a first colour in the form of a flat tint such as pink and the second indicia 19 is printed in a different colour, for example green. When viewed in transmission, the two blocks defining the indicia 18,19 not only cooperate in the overlapping areas to define the image 13 but in addition form that image in a third colour different from the colours of the first and second indicia respectively. In FIG. 8C the first indicia 18 is also shown as it would appear to the observer.

Figure 9:
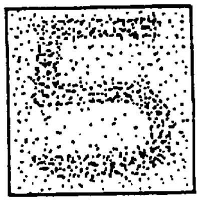
Figure 9:
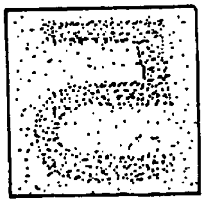
Figure 9:
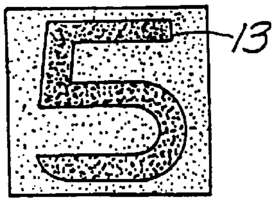

FIG. 9 illustrates a further example in which apparently random dot structures are utilised to define the first and second indicia (FIGS. 9A and 9B respectively). The dot structures are arranged such that when viewed in transmission, a greater density of dots is generated so as to form the appearance of the image 13.

In all these examples, the use of the patch 10 either hides the individual indicia completely when viewed in reflected light or at least prevents one of the indicia from being viewed in reflected light so that the see-through aspect of the device is hidden.

Furthermore, in all these examples, the individual indicia define relatively unrecognisable patterns but when viewed in transmission cooperate together to define a recognisable image 13. It would also be possible, however, for one or both of the first and second indicia in themselves to define recognisable images such as geometric patterns, alphanumeric characters and the like.

The invention also envisages the example of FIG. 8 in which the first and second indicia are provided in different colours and without using the patch 10.

It is also envisaged that additional security can be achieved by associating or linking the image 13 and/or any images defined by the individual indicia with adjacent indicia on the banknote. A simple example is shown in FIG. 1 where the numeral "0" is printed alongside the viewing region 3 in a similar style to the appearance of the image 13. Much more complex associations are also possible including, for example, the use of typical security printed features such as guilloche patterns and the like extending across the boundary of the viewing region 3, the lines being conventionally printed outside the viewing region but defined by the security device as seen in transmission within the viewing region. This would require very complex registration to counterfeit.

Figure 10:
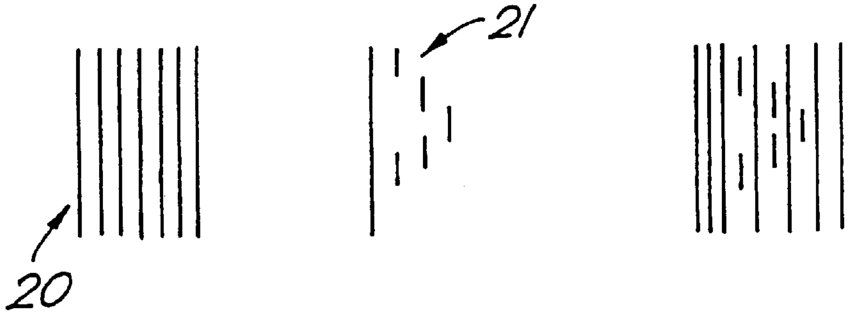
FIG. 10 is a view similar to FIG. 5 but showing a see-through device with an appearance which varies with orientation of viewing.

FIG. 10 illustrates schematically the basis of a different type of see-through feature which takes advantage of the thickness of a substrate to achieve an effect which varies depending upon the orientation of viewing. In this example, the first indicia 20 printed on the surface 6 of the banknote 1 comprises a set of parallel lines. The second indicia 21 printed on the surface 8 of the banknote 1 comprises a set of lines having the same lateral spacing as the lines of the first indicia 20 but arranged to define an image, in this case the letter "P".

In a first example, the lines of the second indicia 21 are printed directly underneath the lines of the first indicia 20. Thus, when the surface 6 of the banknote 1 is viewed normally, the lines of the first indicia 20 will obscure the lines of the second indicia 21. However, when the banknote 1 is tipped in a direction perpendicular to the direction of the lines of the first indicia 20, the second indicia 21 will appear in the spaces between the lines of the first indicia as shown in FIG. 10C.

Figure 11:
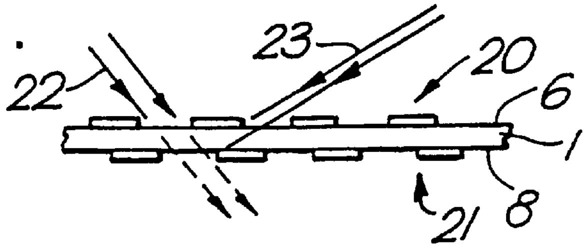
FIG. 11 is a cross-section through a device of the type shown in FIG. 10.

A second example based on this effect is shown in cross-section in FIG. 11. In this case, the lines of the first and second indicia 20,21 have a width equal to twice the thickness of the substrate 1 with the lines of the second indicia 21 being printed laterally offset by half the width of a line relative to the lines of the first indicia 20. With this arrangement, when the surface 6 of the banknote 1 is viewed in a direction 22 the second indicia 21 will be obscured by the first indicia 20 but when the banknote is oriented so that it is viewed in the direction 23 both the first and second indicia 20,21 will be visible. Each viewing direction is at about 45° to the normal. This is a particularly preferred arrangement in that it is relatively straightforward to inspect the device for authenticity but it is difficult to counterfeit the device in view of the requirement for precise registration between the two sets of indicia and accurately, defined line widths.

Figure 12:
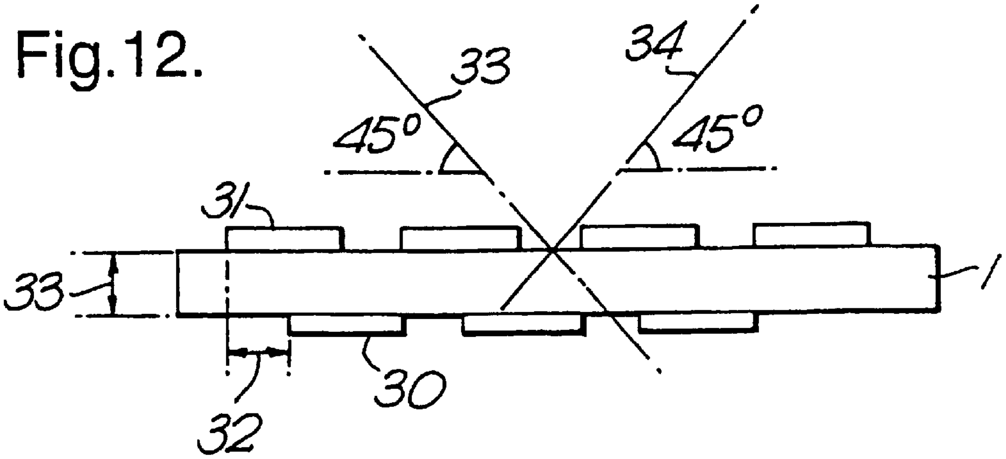
FIG. 12 is a view similar to FIG. 11 but of another device.

A third example is shown in cross-section in FIG. 12. In this case, the reverse lines 30 are offset from the lines 31 closest to the viewer by a distance 32 substantially equal to the thickness 33 of the substrate. In this configuration, the image formed by the reverse lines 30 is obscured when the substrate is viewed at 45° to the substrate in the direction indicated at 33. The image is visible when the substrate is viewed at 45° from the other side as indicated at 34.

The following example demonstrates the principle of the examples shown in FIGS. 10 to 12.

a) A sample of 100 $\mu$m thick plastic film was suitably treated so as to make its surface printable and was printed by dry offset printing to produce a fully registered and visible indicia on the back and front sides of the film. The film was rectangular.

b) The front side indicia comprised a set of parallel, horizontally oriented sinusoidal, lines, having a vertical amplitude of 2 mm and a periodicity of 3 mm and filling a circular area with a radius of 8 mm. The lines were 200 $\mu$m wide and were separated by distance of 100 $\mu$m. In this case, the term "horizontal" refers to an orientation parallel to the long side of the rectangular document.

c) The back side indicia comprised a set of lines identical to those of the top side indicia and identically positioned in relation to the top side with the exception of a 100 $\mu$m vertical offset relative to the lines of the top side indicia and limited to a triangular area whose corners were each coincident with the perimeter of the top side circular indicia. The lines were 200 $\mu$m wide and were separated by distance of 100 $\mu$m. The lines were vertically offset in relation to those of the top side indicia by a distance of 100 $\mu$m.

d) The document thus printed was viewed in several ways. First it was held with the long side horizontal and the top side indicia facing the viewer. The top of the document was tilted away from the viewer causing the viewing angle to be 45°. The front side indicia entirely obscured the back side indicia. Only the top side circular area was visible.

e) Next, holding the document with the long side horizontal and the top side indicia facing the viewer, the top of the document was tilted towards the viewer causing the viewing angle to be 45°, both the front side indicia and the back side indicia were not clearly visible.

f) Attempts to reproduce this effect by photocopying the see-through feature usually failed because registration of the two indicia was not accurate enough to consistently obtain the effect described above. This see-through feature therefore successfully increased the counterfeiting difficulty of the document.

In the examples shown in FIGS. 10, 11 and 12 each set of indicia comprises a set of lines and it will be seen that the variation and appearance can only be generated by tilting the banknote 1 in a direction perpendicular to the line direction.

In a variation, the security device could include more than one set of lines, with the lines of one set extending at a different direction to the lines of the other set. In this way, the banknote 1 would need to be tilted in different directions depending upon which set of lines was being viewed.

In a further alternative, and according to an aspect of the invention the first and second set of indicia define dots. With dot structures, when the banknote is viewed normally, only the first indicia will be visible but the banknote can be tilted in any direction to reveal the dots of the second indicia.

A particularly preferred arrangement involves first and second indicia defined by a combination of lines and dots.

A typical thickness for the substrate 1 is 110 microns.

The examples of FIGS. 10 and 11 could be further enhanced by making use of reflective patches or metallisations as described in connection with FIGS. 1–9.

As with previous examples, the examples shown in FIGS. 10, 11 and 12 could involve providing the first and second indicia 20,21 in different colours so as to achieve colour variation effects.

An example of a security device using overlapping coloured indicia will now be described.

a) A rectangular sample of waterleaf banknote paper similar in size to a banknote was printed with a transparentising resin design illustrated by the outline of FIG. 15, and sized in the manner described in GB-A-2282611.

b) An indicia with a design shown in FIG. 13, was printed by the dry offset printing process in light blue on the front of the paper sample over the transparentised area and covered with an area approximately of 100 square mm.

c) A red indicia with a design shown in FIG. 14 (as viewed from the front side) was printed in the same manner as before on the reverse side of the paper. The two indicia were accurately registered so as to overlap, the overlapping region being illustrated in FIG. 15.

d) The see-through feature was then viewed in several ways. First the front side was viewed in reflected light with the light source and the viewer on the same side of the sample. Only the front side indicia was clearly visible. The front side was then viewed in transmitted light with the sample between the light source and the viewer. In this case, three images became visible. The blue front side indicia, the red back side indicia and a purple indicia in the form of a letter "D" generated from the overlapping front and back indicia. This was a surprising and eye catching effect.

e) Attempts to reproduce this feature with toner based printing methods failed because the toner was optically too dense and caused the combined image to appear black. Attempts to reproduce the effect with other office printing methods also usually failed due to the difficulty to register the two indicia with sufficient accuracy. Furthermore, if the colour intensity was too high the combined image appeared to be black instead of purple and if the colour density was too low the reverse side indicia was obscured by the relatively higher opacity of the paper. The see-through feature therefore successfully increased the counterfeiting difficulty of the document.

What is claimed is:

1. A security device comprising a substrate having a viewing region which is provided on one side with first indicia and on the other side with second indicia overlying the first indicia, the substrate carrying an obscuring material aligned with the second indicia so as to prevent at least the second indicia from being viewed from the one side of the substrate under reflected radiation, the substrate being sufficiently transparent and the obscuring material permitting passage of sufficient transmitted radiation to allow the second indicia to be viewed from the one side of the substrate under transmission conditions, characterised in that the obscuring material is positioned between the first and second indicia.

2. A device according to claim 1, wherein the obscuring material is provided on the one side of the substrate under the first indicia.

3. A device according to claim 1, wherein the obscuring material is provided on the other side of the substrate under the second indicia.

4. A device according to claim 1, wherein the obscuring material prevents at least the second indicia from being viewed from the one side under reflected visible light.

5. A device according to claim 1, wherein the obscuring material comprises an iridescent material.

6. A device according to claim 1, wherein the obscuring material is metallic.

7. A security device comprising a substrate including a viewing region which is provided with first indicia on one side of the substrate and second indicia on the other side of the substrate overlapping the first indicia, wherein at one orientation of viewing the substrate from the one side under transmitted radiation, the first indicia obscure the second indicia, and at another orientation the second indicia are visible through the first indicia, characterized in that the first and second indicia comprise dots.

8. A device according to claim 7, wherein the one orientation of viewing is constituted by viewing the substrate normally.

9. A device according to claim 7, wherein the first and second indicia are provided in different colours.

10. A device according to claim 9, wherein one or both of the first and second indicia are provided in the more than one colour.

11. A security device comprising a substrate including a viewing region which is provided on one side with first indicia and on the other side with second indicia overlying the first indicia, wherein the first and second indicia can both be seen when the device is viewed from one side of the substrate under transmitted radiation, the first and second indicia cooperating together to generate an image different from an appearance of the first and second indicia individually, each of the first and second indicia comprising at least one block, the block(s) of one indicia overlapping the block(s) of the other indicia, and the blocks of the first and second indicia having different colours.

12. A device according to claim 11, wherein each block is defined by a set of lines.

13. A device according to claim 12, wherein the lines of each block are substantially parallel with each other, the lines defining one block of one of the indicia extending at an angle to the lines defining another block in the same indicia.

14. A device according to claim 11, wherein the first and second indicia comprise respective line structures which, when viewed with transmitted radiation, generate a moire pattern defining the image.

15. A device according to claim 11, wherein the colours of the first and second indicia are fluorescent.

16. A device according to claim 11, wherein the image has a colour different from each of the first and second indicia.

17. A device according to claim 1, wherein the first and second indicia can both be seen when the device is viewed from one side of the substrate under transmitted radiation, the first and second indicia cooperating together to generate an image different from the appearance of the first and second indicia individually, each of the first and second indicia comprising at least one block, the at least one block of one indicia overlapping the at least one block of the other indicia, and the blocks of the first and second indicia having different colors.

18. A device according to claim 11, wherein the image has a shape corresponding to a recognisable symbol whereas the first and second indicia do not represent recognisable symbols.

19. A device according to claim 1, wherein the first and/or second indicia individually and/or together define an image.

20. A device according to claim 18, wherein the image comprises one of a pattern, shape or alphanumeric character.

21. A device according to claim 1, wherein the first and/or second indicia is associated with further indicia on the same side of the substrate adjacent the viewing region.

22. A device according to claim 21, wherein the further indicia and associated first or second indicia define a security pattern extending across the viewing region and into part of the substrate surface adjacent the viewing region.

23. A device according to claim 21, wherein the image and further indicia define together a recognisable pattern, shape or alphanumeric character.

24. A device according to any of the preceding claims, wherein the viewing region, prior to being provided with the first and second indicia, has a higher transparency than adjacent regions of the substrate.

25. A device according to claim 24, wherein the viewing region was created during manufacture of the substrate.

26. A device according to claim 1, wherein one or both of the first and second indicia is printed.

27. A device according to claim 1, the device being adapted to be viewed in visible light.

28. A device according to claim 1, wherein the substrate comprises a document of value.

29. A device according to claim 1, wherein the security device comprises a self-supporting element for adhering to a support.

30. A device according to claim 1 in combination with a support, the device being provided on a region of the support through which radiation can be transmitted, the substrate comprising a transparent material which overlies the second indicia and on which is provided the first indicia.

31. A device according to claim 30, wherein the substrate comprises a varnish or lacquer.

32. A device according to claim 30, wherein the second indicia is provided on the support.

33. A device according to claim 7, wherein the first and/or second indicia is associated with further indicia on the same side of the substrate adjacent the viewing region.

34. A device according to claim 7, wherein the viewing region, prior to being provided with the first and second indicia, has a higher transparency than adjacent regions of the substrate.

35. A device according to claim 7, wherein one or both of the first and second indicia is printed.

36. A device according to claim 7, the device being adapted to be viewed in visible light.

37. A device according to claim 7, wherein the substrate comprises a document of value.

38. A device according to claim 7, wherein the security device comprises a self-supporting element for adhering to a support.

39. A device according to claim 7 in combination with a support, the device being provided on a region of the support through which radiation can be transmitted , the substrate comprising a transparent material which overlies the second indicia and on which is provided the first indicia.

40. A device according to claim 11, wherein the first and/or second indicia is associated with further indicia on the same side of the substrate adjacent the viewing region.

41. A device according to claim 11, wherein the viewing region, prior to being provided with the first and second indicia, has a higher transparency than adjacent regions of the substrate.

42. A device according to claim 11, wherein one or both of the first and second indicia is printed.

43. A device according to claim 11, the device being adapted to be viewed in visible light.

44. A device according to claim 11, wherein the substrate comprises a document of value.

45. A device according to claim 11, wherein the security device comprises a self-supporting element for adhering to a support.

46. A device according to claim 11 in combination with a support, the device being provided on a region of the support through which radiation can be transmitted, the substrate comprising a transparent material which overlies the second indicia and on which is provided the first indicia.

* * * * *